United States Patent [19]

Saito et al.

[11] 3,766,547

[45] Oct. 16, 1973

[54] OUTPUT CHARACTER DISPLAY DEVICE FOR USE WITH AUDIO EQUIPMENT

[75] Inventors: Tadao Saito, Saitama; Mitsuyuki Abe, Tokyo, both of Japan

[73] Assignee: Sony Corporation, Shinagawa-ku, Tokyo, Japan

[22] Filed: Dec. 8, 1971

[21] Appl. No.: 205,813

[52] U.S. Cl. ................ 340/366 D, 74/471, 338/128

[51] Int. Cl. .......................... H01c 5/00, G08b 5/00

[58] Field of Search .................... 340/366 R, 366 D, 340/252 R; 179/1 VL, 1 BT, 1 G, 1 GA, 1 GP; 338/128, 123; 200/17 R; 74/471

[56] References Cited

UNITED STATES PATENTS

| | | | |
|---|---|---|---|
| 3,662,313 | 5/1972 | Komatsu | 179/1 VL UX |
| 3,663,755 | 5/1972 | Lace | 338/128 UX |
| 3,478,293 | 11/1969 | Hooten, Jr. | 338/128 |
| 2,782,403 | 2/1957 | Pearce | 340/252 R |
| 3,629,775 | 12/1971 | Kindred | 179/1 G UX |

*Primary Examiner*—John W. Caldwell
*Assistant Examiner*—William M. Wannisky
*Attorney*—Lewis H. Eslinger et al.

[57] ABSTRACT

An audio recording and/or reproducing apparatus having a plurality of channels for transmitting respective signals, for example, four channels in the case of a quadriphonic apparatus, and controls for varying the volume or other transmitting condition of each signal, is provided with a display device for visually indicating the relationship of the volume or other transmitting condition of the signals. In a preferred embodiment, the display device includes a light source for projecting a spot of light on a display panel and being mounted at the intersection of two arms which cross at right angles to each other and are movable in orthogonally related directions in response to the movements of first and second balance control units, such as, variable resistors, for varying the volume attenuation of first and second signals relative to the volume attenuation of third and fourth signals, and for varying the volume attentuation of the first and third signals relative to the volume attenuation of the second and fourth signals, respectively, so that the position of the light spot on the panel is determined by the relative volume attenuations of the four signals.

14 Claims, 6 Drawing Figures

INVENTORS
TADAO SAITO
MITSUYUKI ABE
BY

ATTORNEY

INVENTORS
TADAO SAITO
MITSUYUKI ABE

INVENTORS
TADAO SAITO
MITSUYUKI ABE
BY

ATTORNEY

OUTPUT CHARACTER DISPLAY DEVICE FOR USE WITH AUDIO EQUIPMENT

BACKGROUND OF THE INVENTION

This invention relates generally to audio recording and/or reproducing apparatus having a plurality of channels for transmitting respective signals, for example, four channels as in the case of a quadriphonic apparatus, and more particularly is directed to a display device for indicating the relative transmitting conditions, for example, the relative volume attenuations, of the several signals in the respective channels.

Recently, so-called "four channel stereo" or quadriphonic audio reproducing apparatus has been developed in which four channels are provided for transmitting respective signals to a pair of loudspeakers positioned in front of the listener, for example, at the left- and right-hand corners of a room in front of the listener, and to a pair of additional loudspeakers disposed in back of the listener, for example, at the left- and right-hand corners of the room in back of the listener. With such an arrangement the listener can enjoy the enhanced realism that results from the quadriphonic sounds originating at the four speakers which are hereinafter referred to as the left-front, right-front, left-back and right-back loudspeakers.

In a conventional two-channel stereophonic audio reproducing apparatus employing only two spaced apart speakers, a balance control is provided in order to permit relative variation of the volume attenuation of the signals in the two channels and thereby to relatively vary the loudness or volume of the sounds originating from the two loudspeakers for obtaining a good balance of such sounds for the particular position of the listener who may not be centrally located with respect to the two loudspeakers. Since the sounds originate from only two loudspeakers or sources in the case of a conventional stereophonic audio reproducing apparatus, the listener has no difficulty in sensing the setting of the balance control which provides the most suitable relative loudness or volume of the sounds originating at the two loudspeakers.

A four-channel stereo or quadriphonic audio reproducing apparatus similarly requires balance controls for relatively adjusting the volume or loudness of the sounds originating at the four or more loudspeakers. However, in the latter case, it is difficulat for a listener to determine when an optimum balanced condition is attained for a particular listener position by reason of the fact that the sounds originate from at least four loudspeakers or sources.

SUMMARY OF THE INVENTION

Accordingly, it is generally an object of this invention to provide an audio recording and/or reproducing apparatus having a plurality of channels for transmitting respective signals, for example, four channels in the case of a quadriphonic apparatus, and controls for varying the volume or other transmitting condition of the signals relative to each other, with a display device for indicating the relationship of the volume or other transmitting conditions of the signals.

A more specific object of this invention is to provide a quadriphonic audio reproducing apparatus with a display device for visually indicating when the balance controls of the apparatus are adjusted to provide the optimum listening conditions for a particular position of the listener relative to the loudspeakers.

Another object is to provide a display device, as aforesaid, which can be operated easily by the listener and which is of inexpensive and simple construction.

In accordance with an aspect of this invention, the display device includes an indicating member, for example, a light source for projecting a spot of light on a display panel, which is mounted at the intersection of two arms crossing at right angles to each other and being movable in orthogonally related directions in response to adjustments of first and second balance control units, such as, variable resistors, for varying the volume attenuation of first and second signals relative to the volume attenuation of third and fourth signals, and for varying the volume attenuation of the first and third signals relative to the volume attenuation of the second and fourth signals, respectively, so that the position of the light spot on the panel is determined by the relative volume attenuations of the four signals and thus represents the position of a listener relative to the four loudspeakers indicated on the display panel at which optimum listening conditions will prevail.

The above, and other objects, features and advantages of this invention, will be apparent in the following detailed description of an illustrative embodiment of the invention which is to be read in connection with the accompanying drawings, wherein:

BRIEF DESCRIPTION OF THE PREFERRED EMBODIMENT

Figure 5:
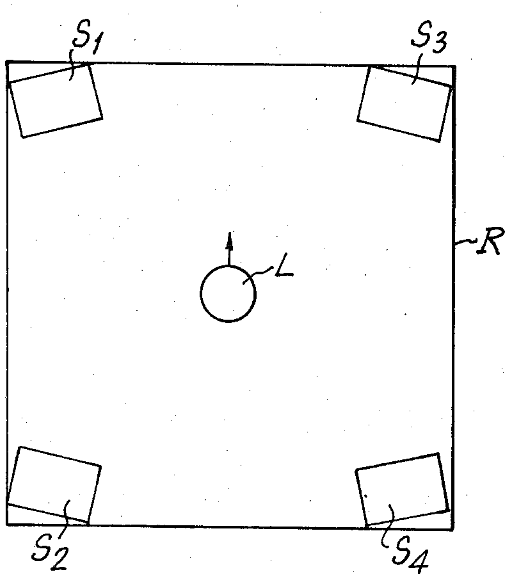
FIG. 5 is a schematic plan view illustrating the positions in a room of the four loudspeakers of the audio reproducing apparatus of FIG. 4.
Figure 6:
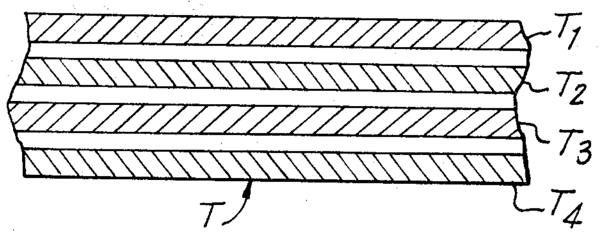
FIG. 6 is a schematic view of a length of a magnetic tape having four signals recorded thereon in respective tracks for reproduction by the apparatus of FIG. 4.
Figure 4:
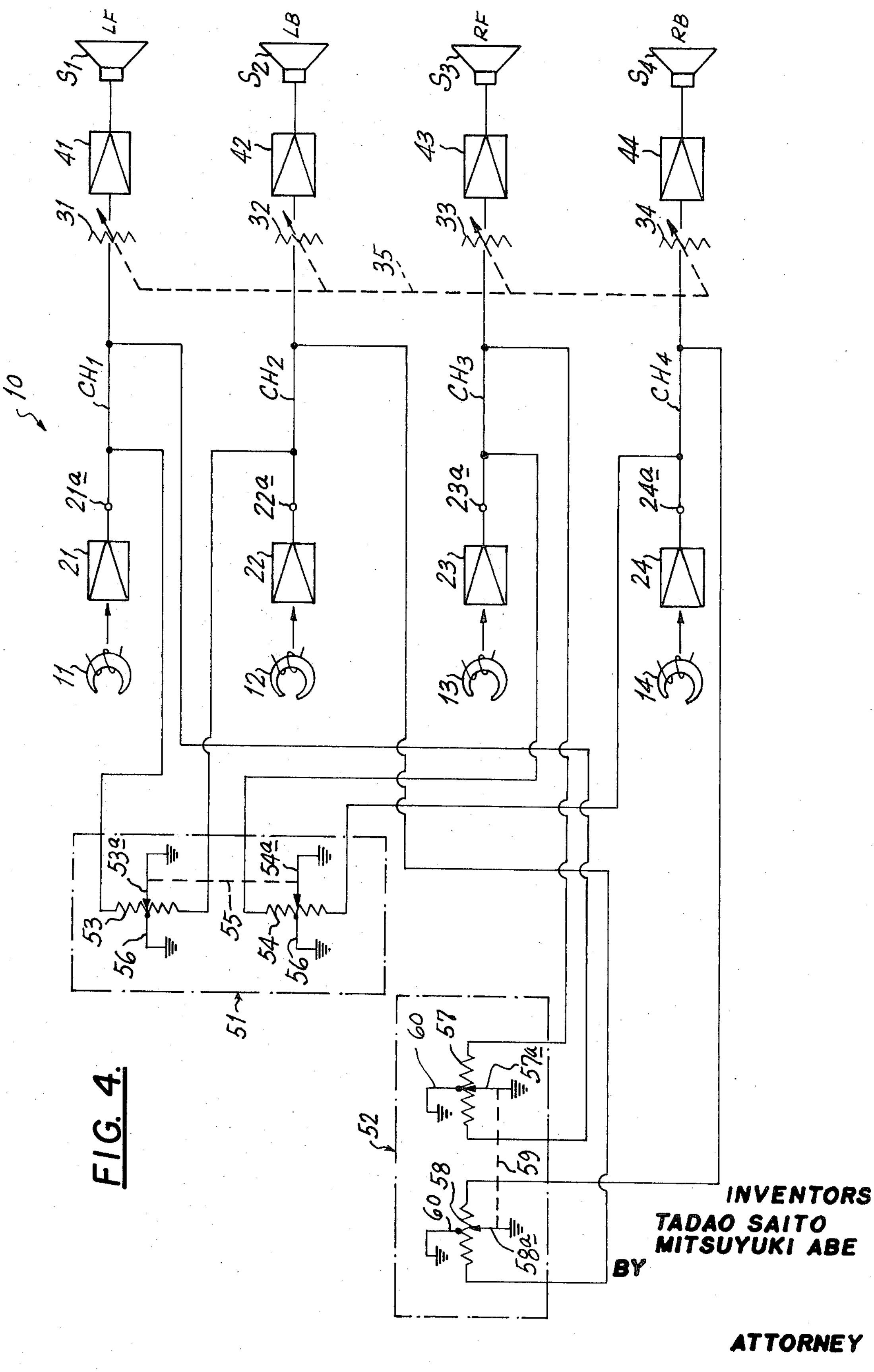
FIG. 4 is an electrical block diagram showing the transmitting channels of a quadriphonic audio reproducing apparatus and the connections thereto of the balance controls associated with a display device in accordance with this invention.

Referring to the drawings in detail, and initially to FIG. 4 thereof, it will be seen that a multi-channel audio reproducing apparatus 10 of a type adapted to be provided with a display device according to this invention is there shown to be a quadriphonic tape reproducing or playback apparatus having four magnetic heads 11,12,13 and 14 which respectively scan tracks $T_1, T_2, T_3$ and $T_4$ on a magnetic tape T (FIG. 6) for reproducing the four-channel music or other audio signals recorded in the respective tracks. The signals reproduced by heads 11, 12,13 and 14 are amplified by preamplifiers 21,22,23 and 24, respectively, and are fed from the output terminals 21*a*,22*a*, 23*a* and 24*a* of the similarly numbered preamplifiers through respective channels $CH_1$,$CH_2$,$CH_3$ and $CH_4$ to loudspeakers $S_{12}$, $S_3$ and $S_4$, respectively. The four channels $CH_1$,$CH_2$,$CH_3$ and $CH_4$ may respectively include volume or loudness control elements 31,32,33 and 34, as shown, which may be in the form of variable resistors having their movable sliders connected to each other, as indicated at 35, for adjustment as a unit, and power amplifiers 41,42,43 and 44. As shown on FIG. 5, the loudspeakers $S_1$–$S_4$ may be arranged in the four corners of a room R, for example, with the speakers $S_1$ and $S_3$ arranged in front of a listener L at the left- and right-hand sides of the listener to constitute the left-front and right-front speakers, and with the loudspeakers $S_2$ and $S_4$ being arranged in back of the listener at the left- and right-hand sides of the listener to constitute the left-back and right-back speakers.

As shown on FIG. 4, the apparatus 10 further comprises a first balance control unit 51 for relatively varying the transmitting conditions, particularly, the volume attenuation, in channels $CH_1$ and $CH_2$ and for similarly relatively varying the volume attenuation in Channels $CH_3$ and $CH_4$; and a second balance control unit 52 for relatively varying the volume attenuation in Channels $CH_1$ and $CH_3$ and similarly relatively varying the volume attenuation in channels $CH_2$ and $CH_4$. As shown, balance control unit 51 may include a resistor 53 having its ends respectively connected to channels $CH_1$ and $CH_2$ and a grounded contact or slider 53*a* movable along rsistor 53, and a resistor 54 having its ends respectively connected to channels $CH_3$ and $CH_4$ and a grounded contact or slider 54*a* movable along resistor 54 and being mechanically connected with slider 53*a*, as indicated at 55, for movement jointly with the latter. The resistors 53 and 54 further preferably have grounded center taps, as indicated at 56. Similarly, the second balance control unit 52 may include a resistor 57 having its ends respectively connected to channels $CH_1$ and $CH_3$ and a grounded contact or slider 57*a* along resistor 57, and a resistor 58 having its ends respectively connected to channels $CH_2$ and $CH_4$ and a grounded contact or slider 58*a* movable along resistor 58 and being mechanically connected with slider 57*a*, as indicated at 59, for movement jointly with the latter. The resistors 57 and 58 are also preferably provided with grounded center taps, as indicated at 60.

In accordance with this invention, the balance control units 51 and 52 are preferably arranged so that the machanical connections or actuators 55 and 59 of the sliders 53*a* and 54*a* and of the sliders 57*a* and 58*a*, respectively, are rectilinearly movable in orthogonally related directions, for example, in the vertical direction and in the lateral direction, respectively, as viewed on FIG. 4. It will be apparent that, with the arrangement shown, upward movement of actuator 55 of balance control unit 51 will reduce the portions of resistors 53 and 54 respectively connected between channel $CH_1$ and ground through the respective slider 53*a* and between channel $CH_3$ and ground through the respective slider 54*a*, whereby to increase the volume attenuation of the signals transmitted through channels $CH_1$ and $CH_3$ to the left-front and right-front loudspeakers $S_1$ and $S_3$. By reason of the center taps 56, upward movement of sliders 53*a* and 54*a* will not vary the portions of resistors 53 and 54 respectively connected between channel $CH_2$ and ground and between channel $CH_4$ and ground, that is, one-half of each of resistors 53 and 54 will remain interposed between channel $CH_2$ and ground and between channel $CH_4$ and ground, so that the volume attenuation of the signals transmitted through channels $CH_2$ and $CH_4$ will be unaffected as will be the volume or loudness of the sounds originating at the left-back and right-back loudspeakers $S_2$ and $S_4$. Accordingly, it will be seen that upward movement of actuator 55 of balance control unit 51 has the effect of reducing the loudness of the sounds originating at the left-front and right-front loudspeakers $S_1$ and $S_3$ relative to the loudness of the sounds originating at the left-back and right-back loudspeakers $S_2$ and $S_4$. Conversely, downward movement of actuator 55 has the effect of increasing the volume attenuation of the signals transmitted through channels $CH_2$ and $CH_4$ and thereby reducing the loudness of the sounds originating at the left-back and right-back loudspeakers $S_2$ and $S_4$ relative to the loudness of the sounds originating at the left-front and right-front loudspeakers $S_1$ and $S_3$.

The operation of the second balance control unit 52 is similar to that of the balance control unit 51 and it will be apparent that, when actuator 59 is moved toward the right, as viewed on FIG. 4, the portions of resistors 57 and 58 respectively connected between channel $CH_3$ and ground through slider 57*a* and between channel $CH_4$ and ground through slider 58*a* will be similarly reduced to increase the volume attenuation of the signals transmitted through channels $CH_3$ and $CH_4$, whereby to correspondingly reduce the loudness of the sounds originating at the right-front and right-back loudspeakers $S_3$ and $S_4$ relative to the loudness of the sounds originating at the left-front and left-back loudspeakers $S_1$ and $S_2$. Conversely, movement of the actuator 59 toward the left, as viewed on FIG. 4, will be effective to reduce the loudness of the sounds originating from the left-front and left-back loudspeakers $S_1$ and $S_2$ relative to the loudness of the sounds originating from the right-front and right-back loudspeaker $S_3$ and $S_4$.

In the above described preferred arrangements of balance control units 51 and 52, the grounded center taps 56 of resistors 53 and 54 and the grounded center taps 60 of resistors 57 and 58 serve to prevent any cross-talk between the channels to which the resistors 53,54,57 and 58 are respectively connected. However, if desired, the grounded center taps 56 and 60 may be omitted and, in that case, the movement of the slider associated with each of the resistors 53,54,57 and 58 will serve to increase and decrease the portions of that resistor that are interposed between the channels that are connected to the ends of the respective resistor and ground through the slider. Thus, in the absence of the center taps 56 and 60, displacement of actuator 55 will serve to oppositely vary the loudness of the sounds originating at the loudspeakers respectively disposed at the front and back of the listener, and similarly displacement of the actuator 59 will serve to oppositely vary the loudness of the sounds originating from the loudspeakers respectively disposed at the opposite sides of the listener.

In any case, it will be apparent that suitable manipulation of actuators 55 and 59 of balance control units 51 and 52, respectively, makes it possible to vary the relative loudness or volume of the sounds originating at the four loudspeakers $S_1$–$S_4$ so as to obtain an optimum balance of such sounds at the actual position of the listener L, which position may not be equidistant from the four loudspeakers. However, by reason of the fact that the sounds originate from four loudspeakers, a listener positioned at any selected location within the room R is not capable of easily perceiving when the loudness of the sounds originating from the several loudspeakers is in optimum balance for that particular location in the room.

Figure 1:
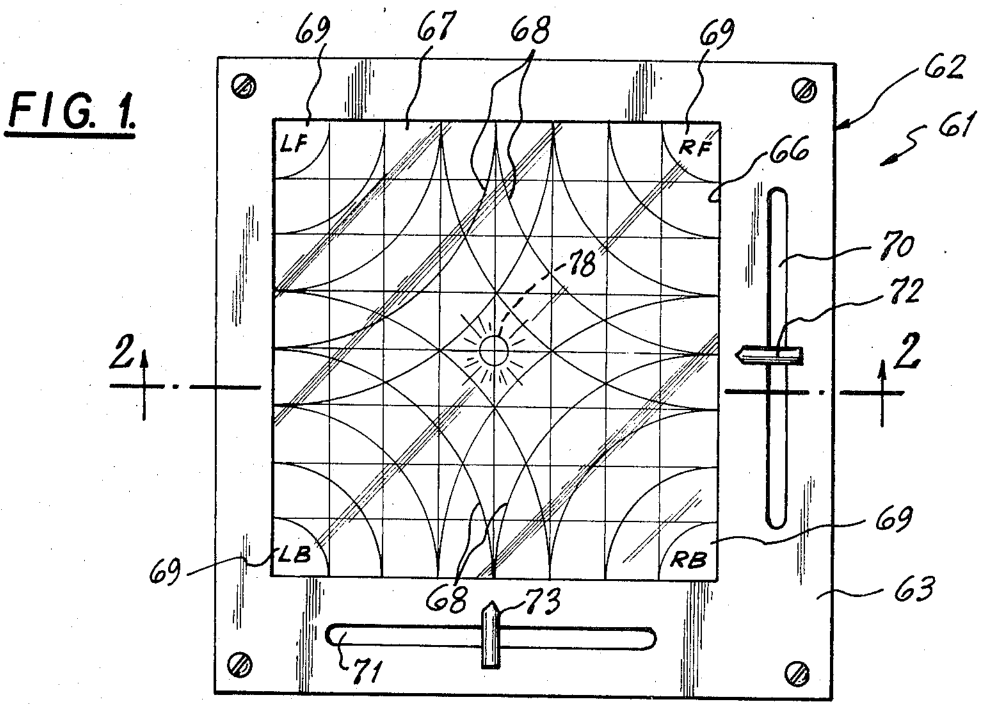
FIG. 1 is a plan view of a display device in accordance with this invention for a four-channel stereo or quadriphonic audio reproducing apparatus.
Figure 2:
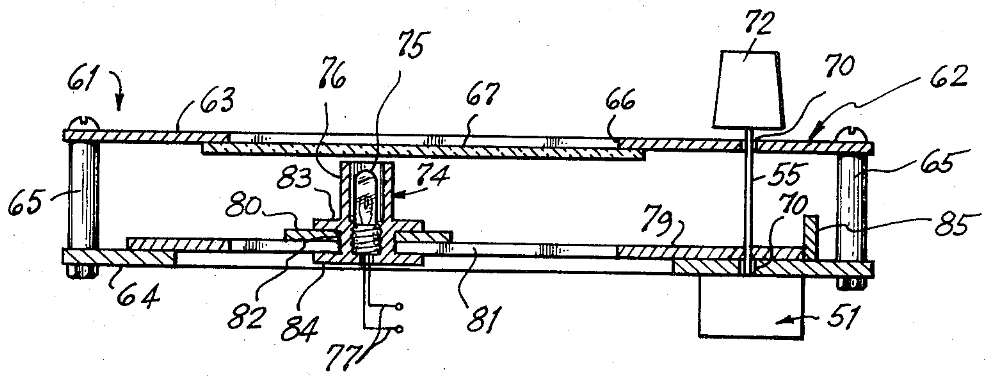
FIG. 2 is a sectional view taken along the line 2—2 on FIG. 1.
Figure 3:
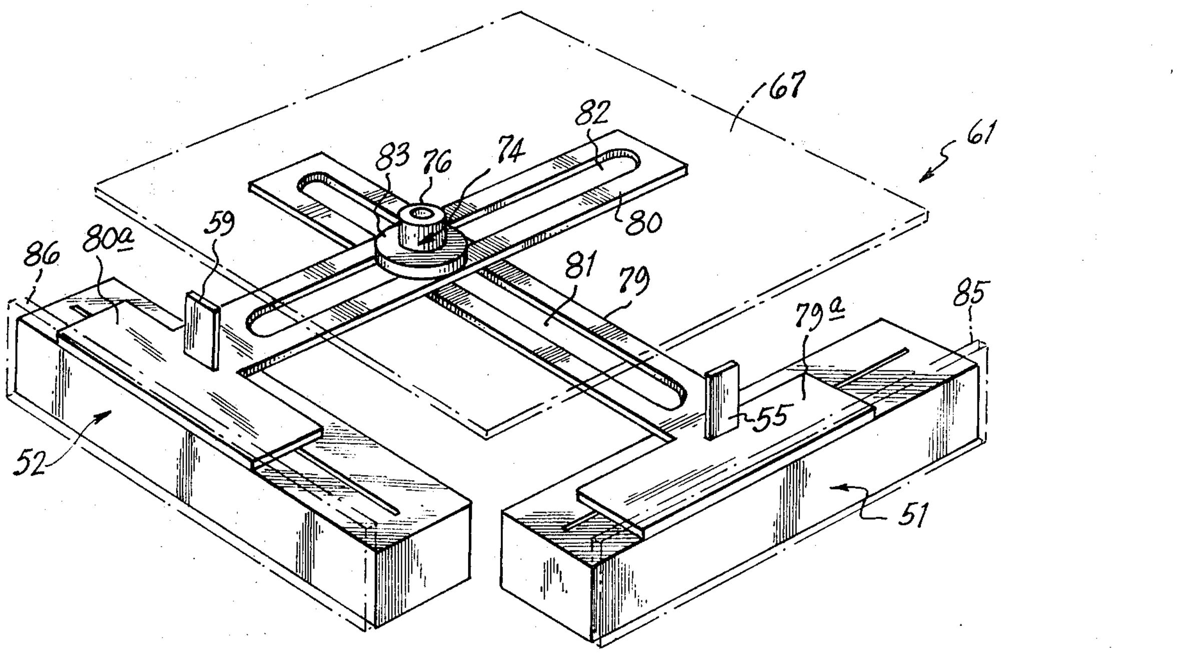
FIG. 3 is a perspective display device with its frame removed and its display panel shown in broken lines to better disclose underlying components of the display device.

Referring now to FIGS. 1,2 and 3, it will be seen that, in accordance with this invention, the balance control units 51 and 52 of the described quadriphonic audio reproducing apparatus 10 are associated with a display device 61 visually indicating the location relative to the four loudspeakers $S_1$–$S_4$ at which optimum listening conditions will prevail for any selected settings or positions of the actuators 55 and 59 of the balance control units. In the illustrated embodiment of the invention, display device 61 is shown to include a frame 62 having a rectangular outer frame member 63 which may be suitably mounted in an opening, or form part of the usual control panel (not shown) of the audio reproducing apparatus 10, and an inner rectangular frame member 64 (FIG. 2) which is spaced rearwardly from frame member 63, as by posts 65 extending therebetween. The rectangular opening 66 of outer frame member 63 is closed by a translucent display panel 67 preferably having patterns thereon of arcuate lines 68 of progressively increasing radii centered at the four corners of panel 67. Further, indicia 69 are preferably provided in the upper and lower corners of panel 67 to identify the locations of the left-front and right-front loudspeakers and the left-back and right-back loudspeakers, respectively.

The balance control units 51 and 52 are suitably mounted in back of inner frame member 64 so as to respectively extend along one side and the bottom of such frame member. The actuator 55 of balance control unit 51 projects forwardly through vertically elongated slots 70 provided along the sides of frame members 63 and 64 behind which balance control unit 51 is located. Similarly, actuator 59 of balance control unit 52 projects forwardly through laterally elongated slots 71 (FIG. 1) provided along the bottom portions of frame members 63 and 64. Handles 72 and 73 are provided on actuators 55 and 59, respectively, in front of frame member 63 for manipulation by a listener in effecting the movements of actuators 55 and 59 referred to above in connection with the description of the operation of apparatus 10.

The display device 61 is further shown to include an indicating member 74 which is located in back of display panel 67 and is movable in orthogonally related directions, that is, vertically and laterally, relative to the display panel so as to occupy a position with respect to the display panel that is determined by the positions of actuators 55 and 59. As shown, indicating member 74 may include a lamp or light source 75 mounted in a socket or holder 76 to which suitable conductors 77 extend through the opening of inner frame member 64 (FIG. 2) for connection of the lamp to a suitable current source (not shown) whereby the lamp 75 will project a spot of light 78 (FIG. 1) on translucent display panel 67 at a location corresponding to the position of holder 76.

In order to make the positioning of holder 76 dependent upon the positions occupied by actuators 55 and 59, display device 61 further includes an arm 79 suitably connected with actuator 55 so as to move vertically with the latter and extending laterally across the opening of inner frame 64 from actuator 55, and an arm 80 suitably connected to actuator 59 for movement laterally with the latter, and extending vertically upward from actuator 59 across the opening of frame member 64 so as to cross arm 79 at right angles to the latter. The arms 79 and 80 have longitudinal slots 81 and 82, respectively, therein, and the holder 76 is slidably received in slots 81 and 82 at the intersection thereof and retained in such slots by spaced collars 83 and 84 provided on holder 76 (FIGS. 2 and 3). In order to ensure that arms 79 and 80 will retain their right-angular relationship to each other while moving vertically and laterally with the respective actuators 55 and 59, the end portions of arms 79 and 80 connected to the respective actuators 55 and 59 may be enlarged, as at 79*a* and 80*a* (FIG. 3), to define guides which slidably engage respective flanges 85 and 86 projecting forwardly from frame member 64 along the slots 70 and 71, respectively in such frame member.

The various parts of display device 61 are preferably arranged so that the light spot 78 projected on panel 67 is centered with respect to such panel, as shown on FIG. 1, when handles 72 and 73 and actuators 55 and 59 are disposed to locate sliders 53*a*, 54*a*, 57*a* and 58*a* at the centers of the respective resistors 53,54,57 and 58, as shown on FIG. 4, that is, to provide equal volume attenuation for the signals transmitted through all four channels $CH_1$–$CH_4$. With the various parts of display device 61 thus arranged, upward movement of handle 72 and movement of handle 73 toward the right from the position shown on FIG. 1 will be effective to move the light spot 78 upward and toward the right from its initial centered position. Such movements of handles 72 and 73, and the corresponding movements of actuators 55 and 59, respectively, will reduce the loudness of the sounds originating from the left-front and right-front loudspeakers relative to the loudness of the sounds originating from the left-back and right-back loudspeakers and also reduce the loudness of the sounds originating from the right-front and right-back loudspeakers relative to the loudness of the sounds originating from the left-front and left-back loudspeakers, as described above with reference to FIG. 4, whereby to provide the optimum conditions for listening to the quadriphonic reproduced sounds at the listening position or location relative to the loudspeakers which is then indicated by the light spot 78 on panel 67. Thus, in operating the balance controls of quadriphonic reproducing apparatus 10, the listener manipulates knobs 72 and 73 until light spots 78 on display panel 67 is located approximately at the location relative to the four loudspeakers that the listener desires to occupy, whereupon the described connection of display device 61 to balance control units 51 and 52 ensures that the relative loudness of the sounds originating at the four loudspeakers will provide the optimum conditions for listening at the selected location.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. In combination with an audio apparatus including means for transmitting a plurality of first signals and a plurality of second signals to respective outputs, first control means for varying a transmitting condition of said first signals relative to a transmitting condition of said second signals, and second control means for varying said transmitting condition of one of said first signals and one of said second signals relative to said transmitting condition of another one of said first signals and another one of said second signals, respectively; a device for indicating the relationship, as to said transmitting condition, of each one of said first and second signals with respect to the other ones of said first and second signals, comprising a first movable member connected to said first control means, the position of said first movable member being representative of the relation of said transmitting condition of said first signals to said transmitting condition of said second signals, a second movable member connected to said second control means, the position of said second movable member being representative of the relation of said transmitting condition of said ones of said first and second signals to said transmitting condition of said other ones of said first and second signals, respectively, an indicating member movable in orthogonally related directions, and connecting means coupling said indicating member to said first and second movable members for displacing said indicating member in one of said orthogonally related directions in response to movement of said first movable member and in the other of said orthogonally related directions in response to movement of said second movable member so that the location of said indicating member is determined by the relative transmitting conditions for all of said first and second signals, said first and second movable members being so arranged that when they are simultaneously moved in said respective orthogonally related directions said first and second control means are simultaneously varied.

2. The combination according to claim 1, in which said first and second movable members are respectively constituted by right-angularly related, elongated arms which cross each other and which are respectively movable in said orthogonally related directions, and said connecting means coupling said indicating member with said first and second movable members slidably engages said respective elongated arms at locations on the latter where said arms cross each other.

3. The combination according to claim 2, in which each of said elongated arms has a longitudinal slot therein, and said connecting means slidably engages in the slots of said arms at said locations where the arms cross each other.

4. The combination according to claim 1, in which said device further comprises a display panel in a plane parallel to said orthogonally related directions, with said indicating member being centrally located with respect to said panel in correspondence to said first and second control means establishing equal transmitting conditions for all of said signals.

5. The combination according to claim 4, in which said display panel is translucent, and said indicating member includes a light source to provide an indicating light spot visible through said translucent panel.

6. The combination according to claim 4, in which said display panel is substantially rectangular and has its sides extending in said orthogonally related directions, and said rectangular panel has patterns of arcuate lines of progressively increasing radii centered at the four corners of the rectangular panel for cooperation with said indicating member in visually indicating said transmitting condition for each of said first signals and second signals.

7. The combination according to claim 1, in which said transmitting condition of each of said first signals and said second signals is the volume thereof at said respective output.

8. In combination with an audio apparatus having first, second, third and fourth channels for transmitting first, second, third and fourth signals to respective outputs, a device for adjusting and indicating the volume attenuation relationships of said first, second, third and fourth signals with respect to each other in said respective channels, comprising first control means for varying the volume attenuation of each of said first and second signals with respect to the volume attenuation of each of said third and fourth signals, respectively, transmitted through the respective channels therefor, second control means for varying the volume attenuation of each of said first and third signals with respect to the volume attenuation of each of said second and fourth signals, respectively, transmitted through the respective channels therefor, a first movable member connected to said first control means, the position of said first movable member being representative of the relation of the volume attenuation of said first and second signals to the volume attenuation of said third and fourth signals as established by said first control means, a second movable member connected to said second control means, the position of said second movable member being representative of the relation of the volume attenuation of said first and third signals to the volume attentuation of said second and fourth signals, respectively, as established by said second control means, an indicating member movable in orthogonally related directions, and connecting means coupling said indicating member and said first and second movable members to allow simultaneous movement of said first and second movable members, with a corresponding simultaneous variance of said first and second control means, and for displacing said indicating member in one of said directions in response to movement of said first movable member and in the other of said directions in response to movement of said second movable member, so that the position of said indicating member visually represents the relative volume attenuations of said first, second, third and fourth signals in the respective channels.

9. The combination according to claim 8, in which said first and second movable members are respectively constituted by right-angularly related, elongated arms which cross each other and which are respectively movable in said orthogonally related directions, and said connecting means coupling said indicating member with said first and second movable members slidably engages said respective elongated arms at locations on the latter where said arms cross each other.

10. The combination according to claim 9, in which each of said elongated arms has a longitudinal slot therein, and said connecting means slidably engages in the slots of said arms at said locations where the arms cross each other.

11. The combination according to claim 8, in which said device further comprises a substantially rectangular display panel disposed in a plane parallel to said orthogonally related directions with the sides of said panel extending in said directions and said indicating member being disposed centrally relative to said panel when the volume attenuations in all of said channels are equal so that the distances of said indicating member from the corners of said panel represent the volume attenuations in respective channels.

12. The combination according to claim 8, in which said first control means includes a first resistor having its ends connected to said first and third channels, respectively, a first slider movable along said first resistor and connected to ground, a second resistor having its ends connected to said second and fourth channels, respectively, and a second slider movable along said second resistor and connected to ground, said first and second sliders being connected to each other for simultaneous movement relative to the respective resistors; and in which said second control means includes a third resistor having its ends connected to said first and second channels, respectively, a third slider movable along said third resistor and being connected to ground, a fourth resistor having its ends connected to said third and fourth channels, respectively, and a fourth slider movable along said fourth resistor and being connected to ground, said third and fourth sliders being connected to each other for simultaneous movement relative to the respective resistors.

13. The combination according to claim 12, in which each of said first, second, third and fourth resistors has a central tap connected to ground to prevent cross-talk between the channels to which the respective resistor is connected.

14. The combination according to claim 12, in which said first and second sliders are rectilinearly movable in one of said orthogonally related directions and said third and fourth sliders are rectilinearly movable in the other of said orthogonally related directions.

* * * * *